US012730352B2

(12) United States Patent
Kunai et al.

(10) Patent No.: US 12,730,352 B2
(45) Date of Patent: Sep. 8, 2026

(54) OPTICAL SWITCH AND SWITCHING METHOD

(71) Applicant: Fujikura Ltd., Tokyo (JP)

(72) Inventors: Yuichiro Kunai, Tokyo (JP); Hiroyuki Kusaka, Tokyo (JP); Masahiro Kashiwagi, Tokyo (JP)

(73) Assignee: Fujikura Ltd., Tokyo (JP)

( * ) Notice: Subject to any disclaimer, the term of this patent is extended or adjusted under 35 U.S.C. 154(b) by 231 days.

(21) Appl. No.: 18/832,197

(22) PCT Filed: Nov. 18, 2022

(86) PCT No.: PCT/JP2022/042812

§ 371 (c)(1),
(2) Date: Jul. 23, 2024

(87) PCT Pub. No.: WO2023/157408

PCT Pub. Date: Aug. 24, 2023

(65) Prior Publication Data

US 2025/0093737 A1 Mar. 20, 2025

(30) Foreign Application Priority Data

Feb. 18, 2022 (JP) ................................ 2022-024219

(51) Int. Cl.
*G02F 1/315* (2006.01)

(52) U.S. Cl.
CPC .......... *G02F 1/315* (2013.01); *G02F 2203/50* (2013.01)

(58) Field of Classification Search
CPC ............. G02F 2203/12; G02F 2203/50; G02F 1/13306; G02F 1/135; G03H 1/2294;
(Continued)

(56) References Cited

U.S. PATENT DOCUMENTS 7,664,395 B2 2/2010 Holmes
2005/0152698 A1* 7/2005 Miyazaki ........... H04Q 11/0005 398/85
2010/0085496 A1 4/2010 New et al.

FOREIGN PATENT DOCUMENTS

JP H04-335317 A 11/1992
JP H05-249507 A 9/1993
(Continued)

OTHER PUBLICATIONS

International Search Report issued in corresponding International Application No. PCT/JP2022/042812 mailed Jan. 31, 2023 (2 pages).

(Continued)

*Primary Examiner* — Brandi N Thomas
(74) *Attorney, Agent, or Firm* — Osha Bergman Watanabe & Burton LLP

(57) ABSTRACT

An optical switch that switches an optical path of signal light obtained by modulating carrier light by a control signal and a data signal includes a mirror and a half mirror, an optical modulation element that reflects or refracts the signal light reflected by the mirror and the half mirror and includes cells each having an independently set phase modulation amount, a light detector that detects, at once, intensities of beams of the signal light passing through the half mirror and reflected by the mirror and the half mirror different times, and a controller that decodes the control signal from the detected intensities and sets the independently set phase modulation amount of each of the cells such that the signal light is emitted in a direction corresponding to the control signal.

8 Claims, 5 Drawing Sheets

(58) Field of Classification Search
CPC ....... G03H 2001/0094; G03H 2240/05; G02B 6/42; G02B 26/00; G02B 26/06; G02B 6/4206; G02B 27/0944; G11B 7/128
See application file for complete search history.

(56) References Cited

FOREIGN PATENT DOCUMENTS

| | | | | |
|---|---|---|---|---|
| JP | H06-294984 A | | 10/1994 | |
| JP | 2004-287215 A | | 10/2004 | |
| JP | 2009-92968 A | | 4/2009 | |
| JP | 2011022003 | * | 2/2011 | ................ G01J 9/02 |
| JP | 2012-133018 A | | 7/2012 | |
| JP | 2015-94779 A | | 5/2015 | |

OTHER PUBLICATIONS

Written Opinion issued in corresponding International Application No. PCT/JP2022/042812 mailed Jan. 31, 2023 (7 pages).

* cited by examiner

OPTICAL SWITCH AND SWITCHING METHOD

BACKGROUND

Technical Field

The present invention relates to an optical switch and a switching method each of which switches an optical path of signal light from one to another.

Discussion of the Background

With increasing data traffic, the demand for increased capacity in optical trunk line networks is increasing. In order to respond to this demand, the form of the optical trunk line network is developed from the point-to-point type to the ring type, and then to the mesh type. For efficient use of the mesh-type optical trunk line network, it is necessary to quickly switch the path of the signal light from one to another. Known optical switches capable of quickly switching the path of the signal light from one to another include an optical switch using a digital mirror device (DMD) and an optical switch using a liquid crystal on silicon (LCOS). For example, Patent Literature 1 discloses an optical switch using LCOS.

PATENT LITERATURE

Patent Literature 1: JP Patent Publication No. 2015-94779

In an optical network, it is sometimes necessary to switch a path of signal light from one to another according to a control signal superimposed on the signal light. However, the optical switch using DMD or LCOS does not have such a function.

SUMMARY

One or more embodiments provide an optical switch having a function to switch an optical path of signal light from one to another according to a control signal superimposed on the signal light.

An optical switch in accordance with one or more embodiments is an optical switch that switches an optical path of signal light from one to another, the signal light being obtained by modulating carrier light by a control signal and a data signal, the optical switch including: a mirror and a half mirror; an optical modulation element configured to reflect or refract the signal light reflected by the mirror and the half mirror, the optical modulation element including a plurality of cells having phase modulation amounts settable independently of each other; a light detector configured to detect, at once, intensities of beams of the signal light having been reflected by the mirror and the half mirror different times and having passed through the half mirror; and a control section configured (a) to decode the control signal from the intensities of the beams of the signal light detected at once by the light detector and (b) to set the phase modulation amounts of the plurality of cells in the optical modulation element so that the signal light is emitted in a direction corresponding to the control signal.

A switching method in accordance with one or more embodiments is a switching method that switches an optical path of signal light from one to another, the signal light being obtained by modulating carrier light by a control signal and a data signal, the switching method including the steps of: reflecting or refracting, with use of an optical modulation element, the signal light reflected by a mirror and a half mirror, the optical modulation element including a plurality of cells having phase modulation amounts settable independently of each other; detecting, at once, intensities beams of the signal light having been reflected by the mirror and the half mirror different times and having passed through the half mirror; and decoding the control signal from the intensities of the beams of the signal light detected at once and setting the phase modulation amounts of the plurality of cells in the optical modulation element so that the signal light is emitted in a direction corresponding to the control signal.

In accordance with one or more embodiments, it is possible to switch an optical path of signal light from one to another according to a control signal superimposed on the signal light.

DESCRIPTION OF THE EMBODIMENTS (Configuration of Optical Switch)

An optical switch 1 is a device that switches an optical path of signal light L from one to another. The signal light L is obtained by modulating carrier light L0 by a control signal C and a data signal D. The control signal C has a bit rate of 1/Tc, and the data signal has a bit rate of 1/Td. That is, the signal light L is modulated by one-bit control signal C per Tc seconds and is modulated by one-bit data signal D per Td seconds.

The control signal C designates an optical path of the signal light L. In one or more embodiments, the control signal C designates one optical path per n bit (n is any natural number of not less than 1). In one or more embodiments, the bit rate Td of the data signal D is set so as to satisfy Td=n×Tc. Therefore, it is possible to switch the optical path of the signal light L from one to another per bit of the data signal D1.

Figure 1:
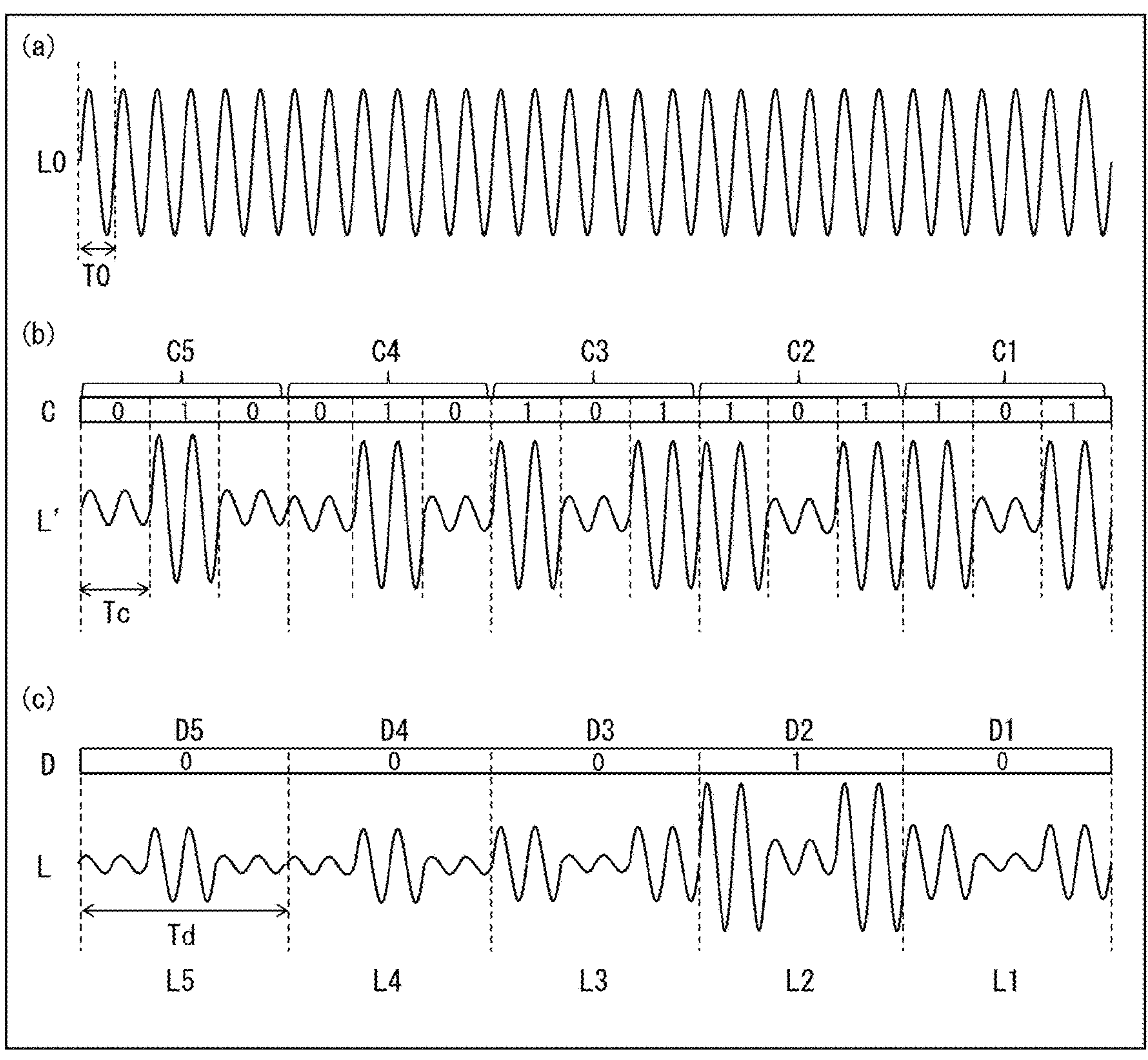
FIG. 1 shows waveform charts illustrating, as an example, waveforms of signal light to be input into an optical switch shown in FIG. 2.

FIG. 1 shows waveform charts illustrating, as an example, waveforms of signal light L1. (a) of FIG. 1 shows a waveform chart illustrating, as an example, a waveform of carrier light L0. (b) of FIG. 1 shows a waveform chart illustrating, as an example, a waveform of signal light L' obtained by modulating the carrier light L0 by the control signal C. (c) of FIG. 1 shows a waveform chart illustrating, as an example, a waveform of the signal light L obtained by modulating the signal light L' by the data signal D.

In the example shown in FIG. 1, Tc=2×T0 and Td=3×Tc=6×T0, where T0 indicates a period of the carrier light L0. Here, n=3. Thus, the control signal C designates one optical path per 3 bits. For example, an optical path of the signal light L1 in which the first bit of the data signal D (which may also be referred to as a "data signal D1") is modulated is designated by first three bits of the control signal C (which may also be referred to as a "control signal C1"), and an optical path of the signal light L2 in which subsequent one bit of the data signal D (which may also be referred to as a "data signal D2") is modulated is designated by subsequent three bits of the control signal C (which may also be referred to as a "control signal C2").

Note that the order of the processes for modulation is not limited to the one shown in FIG. 1. Specifically, instead of the configuration in which the carrier light L0 is modulated by the control signal C and then by the data signal D, a configuration in which the carrier light L0 is modulated by the data signal D and then by the control signal C may be employed. Further, the modulation may be carried out with use of an optical modulator or a multiplexer. In the latter case, for example, it is possible to generate signal light L' by multiplexing signal light Lc indicative of the control signal C into the carrier light L0, and it is possible to generate signal light L by multiplexing signal light Ld indicative of the data signal D into the signal light L'.

Figure 2:
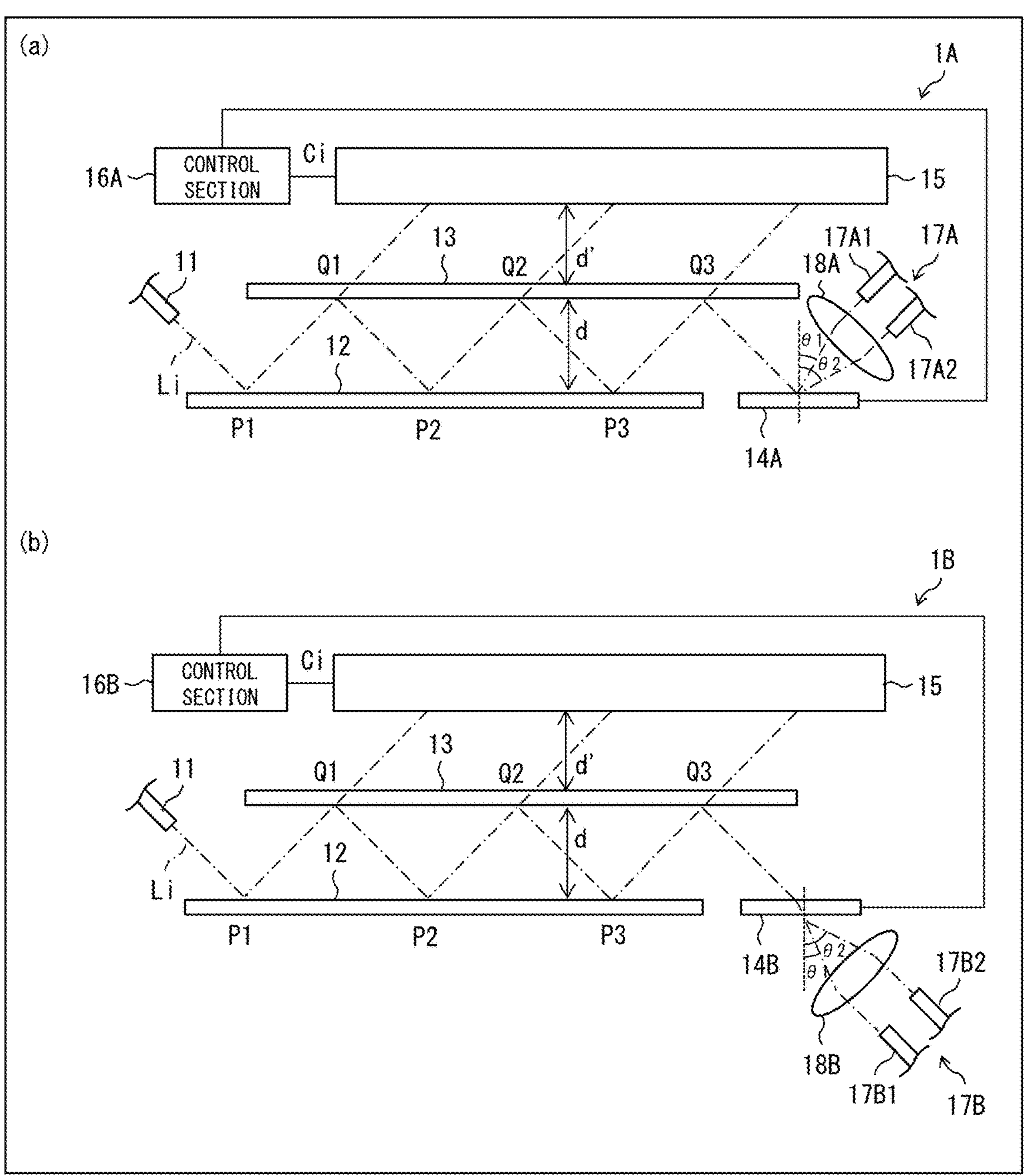
FIG. 2 shows a side view illustrating a configuration of an optical switch in accordance with one or more embodiments, more specifically, a configuration of a reflective optical switch and a configuration of a transmissive optical switch.

(a) of FIG. 2 shows a side view illustrating a configuration example of a reflective optical switch 1. Hereinafter, the reflective optical switch 1 may also be referred to as an optical switch 1A.

The optical switch 1A includes an input port 11, a mirror 12, a half mirror 13, an optical modulation element 14A, a light detector 15, a control section (a controller) 16A, an output port group 17A, and a lens 18A.

The input port 11 is a means that guides signal light Li which is to be input into the optical switch 1A. One or more embodiments use an optical fiber as the input port 11. The signal light Li emitted from the input port 11 enters the mirror 12.

The mirror 12 is a means that reflects the signal light Li having entered the mirror 12. The half mirror 13 is a means that reflects a portion of the signal light Li having entered the half mirror 13 and allows a portion of the signal light Li having entered the half mirror 13 to pass therethrough. The mirror 12 and the half mirror 13 are disposed so that their respective reflecting surfaces face each other. In one or more embodiments, the signal light Li having entered the mirror 12 (1) is reflected by a point P1 in the mirror 12, (2) is reflected by a point Q1 in the half mirror 13, (3) is reflected by a point P2 in the mirror 12, (4) is reflected by a point Q2 in the half mirror 13, (5) is reflected by a point P3 in the mirror 12, and (6) is reflected by a point Q3 in the half mirror 13. The signal light Li having reflected by the point Q3 in the half mirror 13 enters the optical modulation element 14A. The signal light Li having passed through the points Q1, Q2, and Q3 in the half mirror 13 enters the light detector 15.

A distance d between the mirror 12 and the half mirror 13 is set so that a period of time from (i) reflection of the signal light Li by the half mirror 13 to (ii) re-entry of the signal light Li into the half mirror 13 is Tc. In other words, the distance d is set so that an optical path length of the signal light Li from a point Qi (i is a natural number of not less than 1 and not more than n−1), through a point Pi+1, to a point Qi+1 is c×Tc (c is a speed of light). Consequently, in synchronization with a timing when the signal light Li modulated by the data signal Di enters the optical modulation element 14A, (1) the signal light Li having passed through the point Q1 in the half mirror 13 and having been modulated by the first bit of the control signal Ci, (2) the signal light Li having passed through the point Q2 in the half mirror 13 and having been modulated by the second bit of the control signal Ci, and (3) the signal light Li having passed through the point Q3 in the half mirror 13 and having been modulated by the third bit of the control signal Ci enter the light detector 15 at once.

The optical modulation element 14A is a means that modulates and reflects the signal light Li, and is constituted by a plurality of cells having phase modulation amounts settable independently of each other. The optical modulation element 14A may sometimes be called a "spatial optical modulator". A configuration example of the optical modulation element 14A will be described later with reference to a different drawing. The phase modulation amounts of the cells constituting the optical modulation element 14A are controlled by the control section 16A so that the signal light Li is emitted in a direction corresponding to the control signal Ci.

The light detector 15 is a means that detects, at once, beams of signal light Li having been reflected by the mirror 12 and the half mirror 13 different times and having passed through the half mirror 13. In other words, the light detector 15 is a means that detects, as a spatial distribution of intensities of the beams of the signal light Li having passed through the half mirror 13, changes over time in the intensity of the signal light Li. One or more embodiments use an image sensor as the light detector 15. In one or more embodiments, the light detector 15 detects, at once, (1) the signal light Li having passed through the point Q1 in the half mirror 13 and having been modulated by the first bit of the control signal Ci, (2) the signal light Li having passed through the point Q2 in the half mirror 13 and having been modulated by the second bit of the control signal Ci, and (3) the signal light Li having passed through the point Q3 in the half mirror 13 and having been modulated by the third bit of the control signal Ci. The intensities of the beams of the signal light Li detected by the light detector 15 are provided to the control section 16A.

One or more embodiments employ a configuration in which the light detector 15 detects, at once, intensities of a beam of the signal light Li reflected by the mirror 12 once, a beam of the signal light Li reflected by the mirror 12 twice, and a beam of the signal light Li reflected by the mirror 12 three times. However, the present invention is not limited to this configuration. For example, it is possible to employ a configuration in which the light detector 15 detects, at once, intensities of a beam of the signal light Li reflected by the mirror 12 twice, a beam of the signal light Li reflected by the mirror 12 three times, and a beam of the signal light Li reflected by the mirror 12 four times. In a case where a configuration in which the signal light Li emitted from the input port 11 is reflected by the half mirror 13 before being reflected by the mirror 12 is employed, it is possible to employ a configuration in which the light detector 15 detects, at once, intensities of a beam of the signal light Li not reflected by the mirror 12, a beam of the signal light Li reflected by the mirror 12 once, and a beam of the signal light Li reflected by the mirror 12 twice. In general, it is possible to employ a configuration in which the light detector 15 detects, at once, intensities of a beam of the signal light Li reflected by the mirror 12 m times, a beam of the signal light Li reflected by the mirror 12 m+1 times, . . . , and a beam of the signal light reflected by the mirror 12 m+n times, where m is any integer of not less than 0.

The control section 16A is a means that (a) decodes the control signal Ci from the intensities of the beams of the signal light Li detected by the light detector 15 and (b) sets the phase modulation amounts of the cells in the optical modulation element 14A so that the signal light Li is reflected in a direction corresponding to the control signal Ci thus decoded. In the illustrated example, in a case where the control signal Ci is 101, the control section 16A sets the phase modulation amounts of the cells in the optical modulation element 14A so that the signal light Li is reflected in a direction in which an emission angle thereof is θ1. Meanwhile, in a case where the control signal Ci is 010, the control section 16A sets the phase modulation amounts of the cells in the optical modulation element 14A so that the signal light Li is reflected in a direction in which an emission angle thereof is θ2.

The output port group 17A is constituted by a plurality of output ports 17A1 and 17A2. Each of the output ports 17A1 and 17A2 is a means that guides the signal light Li to be output from the optical switch 1A. One or more embodiments use an optical fiber as each of the output ports 17A1 and 17A2.

The output port 17A1 is disposed on an optical path of the signal light Li reflected by the optical modulation element 14A so that the emission angle thereof is θ1. Thus, in a case where the control signal Ci is 101, the signal light Li reflected by the optical modulation element 14A enters the output port 17A1 and then is guided through the output port 17A1. Meanwhile, the output port 17A2 is disposed on an optical path of the signal light Li reflected by the optical modulation element 14A so that the emission angle thereof is θ2. Thus, in a case where the control signal Ci is 010, the signal light Li reflected by the optical modulation element 14A enters the output port 17A2 and then is guided through the output port 17A2.

The lens 18A is a means that collects the signal light Li reflected by the optical modulation element 14A. The lens 18A collects, into an entrance end surface of the output port 17A1, the signal light Li reflected by the optical modulation element 14A so that the emission angle thereof is θ1. Further, the lens 18A collects, into an entrance end surface of the output port 17A2, the signal light Li reflected by the optical modulation element 14A so that the emission angle thereof is θ2. Providing the lens 18A makes it possible to cause the signal light Li reflected by the optical modulation element 14A to efficiently enter the output ports 17A1 and 17A2.

Note that the mirror 12 may be realized by an optical modulation element. In this case, a region of a portion of the optical modulation element may be used as the optical modulation element 14A, and a region of the other portion of the optical modulation element may be used as the mirror 12. Further, the optical switch 1A may include a plurality of sets of the input port 11 and the output port group 17A. With this, it is possible to realize a multichannel optical switch.

In one or more embodiments, a distance d' between the half mirror 13 and the light detector 15 is equal to the distance d between the mirror 12 and the half mirror 13. This makes it possible to make (i) a time when a portion of the signal light Li which portion corresponds to the head of the data signal Di reaches the optical modulation element 14A coincide with (ii) a time when portions of the signal light Li which portions respectively correspond to the heads of the first bit, the second bit, and the third bit of the control signal Ci simultaneously reach the light detector 15. In this case, however, when considering a period of time required to decode the control signal Ci and to control the optical modulation element 14A, it is difficult to reflect, in a direction designated by the control signal Ci, the portion of the signal light Li which portion corresponds to the head of the data signal Di. In view of this, the distance d' between the half mirror 13 and the light detector 15 may be set smaller than the distance d between the mirror 12 and the half mirror 13. Consequently, before the portion of the signal light Li which portion corresponds to the head of the data signal Di reaches the optical modulation element 14A, the portions of the signal light Li which portions respectively correspond to the heads of the first bit, the second bit, and the third bit of the control signal Ci simultaneously reach the light detector 15. Thus, it becomes easy to reflect, in a direction designated by the control signal Ci, the portion of the signal light Li which portion corresponds to the head of the data signal Di.

(b) of FIG. 2 shows a side view illustrating a configuration example of a transmissive optical switch 1. Hereinafter, the transmissive optical switch 1 may also be referred to as an optical switch 1B.

The optical switch 1B includes an input port 11, a mirror 12, a half mirror 13, an optical modulation element 14B, a light detector 15, a control section (a controller) 16B, an output port group 17B, and a lens 18B. The input port 11, the mirror 12, the half mirror 13, and the light detector 15 included in the optical switch 1B have similar configurations to the input port 11, the mirror 12, the half mirror 13, and the light detector 15 included in the optical switch 1A, respectively.

The optical modulation element 14B is a means that modulates and refracts signal light Li, and is constituted by a plurality of cells having phase modulation amounts settable independently of each other. The optical modulation element 14B may sometimes be called a "spatial optical modulator". A configuration example of the optical modulation element 14B will be described later with reference to a different drawing. The phase modulation amounts of the cells constituting the optical modulation element 14B are controlled by the control section 16B so that the signal light Li is emitted in a direction corresponding to the control signal Ci.

The control section 16B is a means that (a) decodes the control signal Ci from the intensities of the beams of the signal light Li detected by the light detector 15 and (b) sets the phase modulation amounts of the cells in the optical modulation element 14B so that the signal light Li is refracted in a direction corresponding to the control signal Ci thus decoded. In the illustrated example, in a case where the control signal Ci is 101, the control section 16B sets the phase modulation amounts of the cells in the optical modulation element 14B so that the signal light Li is refracted in a direction in which an emission angle is θ1. Meanwhile, in a case where the control signal Ci is 010, the control section 16B sets the phase modulation amounts of the cells in the optical modulation element 14B so that the signal light Li is refracted in a direction in which an emission angle is θ2.

The output port group 17B is constituted by a plurality of output ports 17B1 and 17B2. Each of the output ports 17B1 and 17B2 is a means that guides the signal light Li to be output from the optical switch 1B. One or more embodiments use an optical fiber as each of the output ports 17B1 and 17B2.

The output port 17B1 is disposed on an optical path of the signal light Li refracted by the optical modulation element 14B so that the emission angle thereof is θ1. Thus, in a case where the control signal Ci is 101, the signal light Li refracted by the optical modulation element 14B enters the output port 17B1 and then is guided through the output port 17B1. Meanwhile, the output port 17B2 is disposed on an optical path of the signal light Li refracted by the optical modulation element 14B so that the emission angle thereof is θ2. Thus, in a case where the control signal Ci is 010, the signal light Li refracted by the optical modulation element 14B enters the output port 17B2 and then is guided through the output port 17B2.

The lens 18B is a means that collects the signal light Li refracted by the optical modulation element 14B. The lens 18B collects, into an entrance end surface of the output port 17B1, the signal light Li refracted by the optical modulation element 14B so that the emission angle thereof is θ1. The lens 18B collects, into an entrance end surface of the output port 17B2, the signal light Li refracted by the optical modulation element 14B so that the emission angle thereof is θ2. Providing the lens 18B makes it possible to cause the signal light Li refracted by the optical modulation element 14B to efficiently enter the output ports 17B1 and 17B2.

Note that the mirror 12 may be realized by an optical modulation element. In this case, a region of a portion of the optical modulation element may be used as the optical modulation element 14B, and a region of the other portion of the optical modulation element may be used as the mirror 12. Further, the optical switch 1B may include a plurality of sets of the input port 11 and the output port group 17B. With this, it is possible to realize a multichannel optical switch.

In one or more embodiments, a distance d' between the half mirror 13 and the light detector 15 is equal to a distance d between the mirror 12 and the half mirror 13. This makes it possible to make (i) a time when a portion of the signal light Li which portion corresponds to the head of the data signal Di reaches the optical modulation element 14B coincide with (ii) a time when portions of the signal light Li which portions respectively correspond to the heads of the first bit, the second bit, and the third bit of the control signal Ci simultaneously reach the light detector 15. In this case, however, when considering a period of time required to decode the control signal Ci and to control the optical modulation element 14B, it is difficult to refract, in a direction designated by the control signal Ci, the portion of the signal light Li which portion corresponds to the head of the data signal Di. In view of this, the distance d' between the half mirror 13 and the light detector 15 may be set smaller than the distance d between the mirror 12 and the half mirror 13. Consequently, before the portion of the signal light Li which portion corresponds to the head of the data signal Di reaches the optical modulation element 14B, the portions of the signal light Li which portions respectively correspond to the heads of the first bit, the second bit, and the third bit of the control signal Ci simultaneously reach the light detector 15. Thus, it becomes easy to refract, in a direction designated by the control signal Ci, the portion of the signal light Li which portion corresponds to the head of the data signal Di.

(Configuration Example of Reflective Optical Modulation Element)

Figure 3:
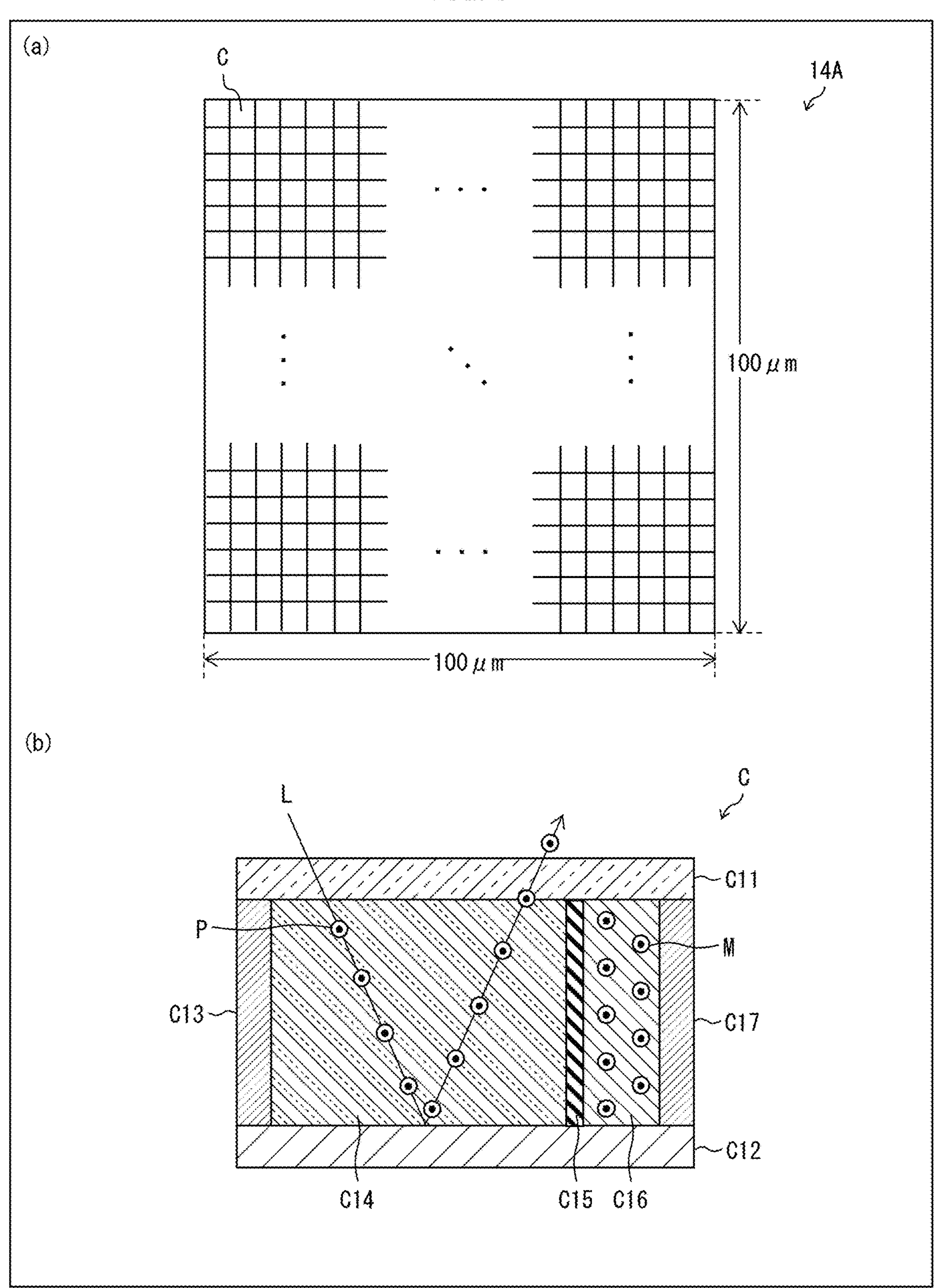
FIG. 3 shows a plan view of a reflective optical modulation element included in the optical switch shown in (a) of FIG. 2 and a cross-sectional view of a cell included in the optical modulation element.

The following description will discuss, with reference to FIG. 3, a configuration example of a reflective optical modulation element 14A included in the reflective optical switch 1A. (a) of FIG. 3 is a plan view of the optical modulation element 14A in accordance with the present specific example. (b) of FIG. 3 is a cross-sectional view of a microcell C included in the optical modulation element 14A in accordance with the present specific example.

As shown in (a) of FIG. 3, the optical modulation element 14A is constituted by a plurality of microcells C having phase modulation amounts set independently of each other. When signal light Li enters the optical modulation element 14A, the resulting beams of the signal light Li being reflected by the microcells C while being subjected to phase modulation interfere with each other, whereby signal light Li to be emitted in a direction corresponding to the control signal Ci is formed. The phase modulation amount of each microcell C may be variable or fixed. In the present configuration example, the phase modulation amount of each microcell C is variable.

Note that, in the present specification, the "microcell" refers to a cell having a cell size of less than 10 μm, for example. The "cell size" refers to a square root of an area of the cell. For example, in a case where the microcell C has a square shape in a plan view, the cell size of the microcell C refers to a length of one side of the microcell C. A lower limit of the cell size of the microcell C is, for example, 1 nm.

The optical modulation element 14A illustrated in (a) of FIG. 3 is constituted by 200×200 microcells C arranged in a matrix. Each of the microcells C has a square shape having a size of 500 nm×500 nm in a plan view. The optical modulation element 14A has a square shape having a size of 100 μm×100 μm in a plan view.

Each of the microcells C constituting the optical modulation element 14A may be made of, for example, a polarizing plate C11, a reflecting plate C12, a first electrode C13, a magnetization free layer C14, an insulating layer C15, a magnetization fixed layer C16, and a second electrode C17, as shown in (b) of FIG. 3.

The polarizing plate C11 and the reflecting plate C12 are disposed opposite to each other. The first electrode C13, the magnetization free layer C14, the insulating layer C15, the magnetization fixed layer C16, and the second electrode C17 are stacked in this order, and are sandwiched between the polarizing plate C11 and the reflecting plate C12. Here, a direction in which the first electrode C13, the magnetization free layer C14, the insulating layer C15, the magnetization fixed layer C16, and the second electrode C17 are stacked is orthogonal to a direction in which the polarizing plate C11 and the reflecting plate C12 are stacked. Thus, a first side surface of the magnetization free layer C14 is in surface contact with one main surface of the polarizing plate C11, and a second side surface of the magnetization free layer C14 which second side surface is opposite to the first side surface is in surface contact with one main surface of the reflecting plate C12. Signal light Li (1) enters an inside of the magnetization free layer C14 through the polarizing plate C11, (2) is reflected by the reflecting plate C12, and (3) is emitted through the polarizing plate C11 to an outside of the magnetization free layer C14.

The magnetization free layer C14 is made of, for example, an electrically conductive, light-transmissive, soft magnetic material (for example, CoFeB). The magnetization fixed layer C16 is made of, for example, an electrically conductive hard magnetic material (for example, permalloy). Selected as the polarizing plate C11 is a polarizing plate that selectively transmits a polarized light component having a polarization direction P parallel to a magnetization direction M of the magnetization fixed layer C16. (b) of FIG. 3 illustrates, as an example, a case where the magnetization direction M and the polarization direction P are parallel to both a main surface of the polarizing plate C11 and a main surface of the magnetization fixed layer C16.

When a potential difference is provided between the first electrode C13 and the second electrode C17, a tunnel effect occurs and injects a spin flow (a flow of spin-polarized electrons) from the magnetization fixed layer C16 through the insulating layer C15 into the magnetization free layer C14 to magnetize the magnetization free layer C14. Here, the magnetization occurring in the magnetization free layer C14 is magnetization parallel to the magnetized direction M of the magnetization fixed layer C16, that is, magnetization parallel to the polarized direction P of the signal light entering the magnetization free layer C14 through the polarizing plate C11. Thus, a phase of the signal light is delayed by a transverse Kerr effect during a process of transmission in the magnetization free layer C14.

Here, a phase modulation amount of the cell C for the signal light is determined depending on a magnitude of the magnetization in the magnetization free layer C14. The magnitude of the magnetization in the magnetization free layer C14 is determined depending on a magnitude of the spin flow injected into the magnetization free layer C14. The magnitude of the spin flow injected into the magnetization free layer C14 is determined depending on the potential difference provided between the first electrode C13 and the second electrode C17. Thus, by regulating the potential difference provided between the first electrode C13 and the second electrode C17, it is possible to set phase modulation of the cell C at a desired value.

As discussed above, the optical modulation element 14A is constituted by the plurality of cells C that carry out phase modulation by spin injection into the magnetization free layer C14. Therefore, the optical modulation element 14A can switch the optical path of the signal light Li from one to another more quickly, when compared to DMD or LCOS.

The description of the present configuration example has dealt with the microcell C having a similar configuration to that of a spin transfer torque (STT) magnetoresistive random access memory (MRAM). However, this is not limitative. For example, a microcell C having a similar configuration to that of a spin orbit torque (SOT) MRAM may be used. Note that such a microcell C can be realized by removing, from the structure indicated in (b) of FIG. 3, the insulating layer C15, the magnetization fixed layer C16, and the second electrode C17, for example. In this case, for example, it is possible to efficiently inject a spin flow into the magnetization free layer C14 by incorporating heavy metal in the first electrode C13 and giving a pulse voltage or a pulse current to the first electrode C13.

(Configuration Example of Transmissive Optical Modulation Element)

Figure 4:
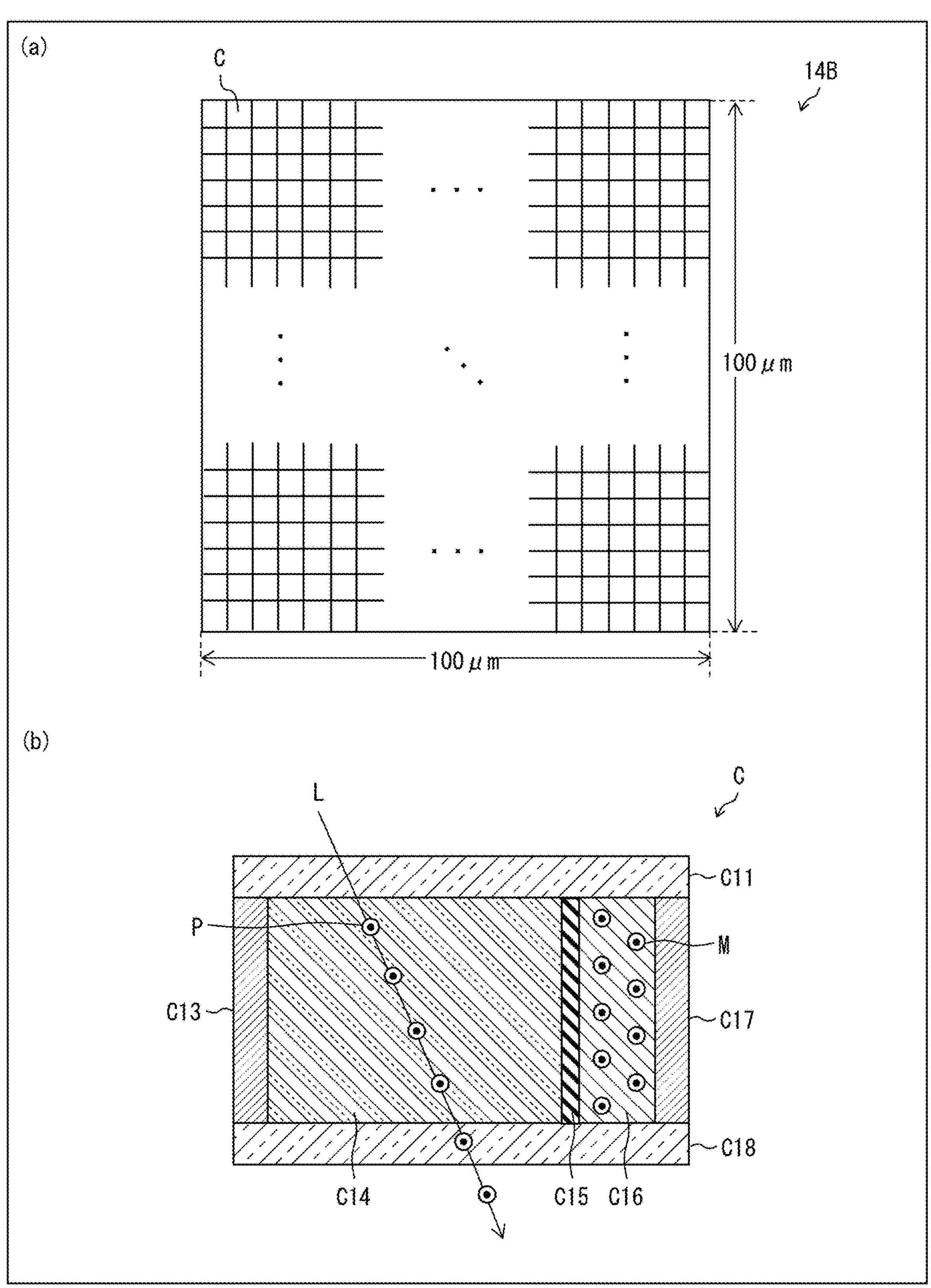
FIG. 4 shows a plan view of a transmissive optical modulation element included in the optical switch shown in (b) of FIG. 2 and a cross-sectional view of a cell included in the optical modulation element.

The following description will discuss, with reference to FIG. 4, a configuration example of a transmissive optical modulation element 14B included in the transmissive optical switch 1B. (a) of FIG. 4 is a plan view of the optical modulation element 14B in accordance with the present specific example. (b) of FIG. 4 is a cross-sectional view of a microcell C included in the optical modulation element 14B in accordance with the present specific example.

As shown in (a) of FIG. 4, the optical modulation element 14B is constituted by a plurality of microcells C having phase modulation amounts set independently of each other. When signal light Li enters the optical modulation element 14B, the resulting beams of the signal light Li passing through the microcells C while being subjected to phase modulation interfere with each other, whereby signal light Li to be emitted in a direction corresponding to the control signal Ci is formed. The phase modulation amount of each microcell C may be variable or fixed. In the present configuration example, the phase modulation amount of each microcell C is variable.

The optical modulation element 14B illustrated in (a) of FIG. 4 is constituted by 200×200 microcells C arranged in a matrix. Each of the microcells C has a square shape having a size of 500 nm×500 nm in a plan view. The optical modulation element 14B has a square shape having a size of 100 μm×100 μm in a plan view.

Each of the microcells C constituting the optical modulation element 14B may be made of, for example, a polarizing plate C11, a polarizing plate C18, a first electrode C13, a magnetization free layer C14, an insulating layer C15, a magnetization fixed layer C16, and a second electrode C17, as shown in (b) of FIG. 4.

The polarizing plate C11 and the polarizing plate C18 are disposed opposite to each other. The first electrode C13, the magnetization free layer C14, the insulating layer C15, the magnetization fixed layer C16, and the second electrode C17 are stacked in this order, and are sandwiched between the polarizing plate C11 and the polarizing plate C18. Here, a direction in which the first electrode C13, the magnetization free layer C14, the insulating layer C15, the magnetization fixed layer C16, and the second electrode C17 are stacked is orthogonal to a direction in which the polarizing plate C11 and the reflecting plate C12 are stacked. Thus, a first side surface of the magnetization free layer C14 is in surface contact with one main surface of the polarizing plate C11, and a second side surface of the magnetization free layer C14 which second side surface is opposite to the first side surface is in surface contact with one main surface of the reflecting plate C12. Signal light Li (1) enters an inside of the magnetization free layer C14 through the polarizing plate C11, (2) passes through the magnetization free layer C14, and (3) is emitted through the polarizing plate C18 to an outside of the magnetization free layer C14.

The magnetization free layer C14 is made of, for example, an electrically conductive, light-transmissive, soft magnetic material (for example, CoFeB). The magnetization fixed layer C16 is made of, for example, an electrically conductive hard magnetic material (for example, permalloy). Selected as each of the polarizing plates C11 and C18 is a polarizing plate that selectively transmits a polarized light component having a polarization direction P parallel to a magnetization direction M of the magnetization fixed layer C16. (b) of FIG. 4 illustrates, as an example, a case where the magnetization direction M and the polarization direction P are parallel to both a main surface of the polarizing plate C11 and a main surface of the magnetization fixed layer C16.

When a potential difference is provided between the first electrode C13 and the second electrode C17, a tunnel effect occurs and injects a spin flow (a flow of spin-polarized electrons) from the magnetization fixed layer C16 through the insulating layer C15 into the magnetization free layer C14 to magnetize the magnetization free layer C14. Here, the magnetization occurring in the magnetization free layer C14 is magnetization parallel to the magnetized direction M of the magnetization fixed layer C16, that is, magnetization parallel to the polarized direction P of the signal light entering the magnetization free layer C14 through the polarizing plate C11. Thus, a phase of the signal light is delayed by a transverse Kerr effect during a process of transmission in the magnetization free layer C14.

Here, a phase modulation amount of the cell C for the signal light is determined depending on a magnitude of the magnetization in the magnetization free layer C14. The magnitude of the magnetization in the magnetization free layer C14 is determined depending on a magnitude of the spin flow injected into the magnetization free layer C14. The magnitude of the spin flow injected into the magnetization free layer C14 is determined depending on the potential difference provided between the first electrode C13 and the second electrode C17. Thus, by regulating the potential difference provided between the first electrode C13 and the second electrode C17, it is possible to set phase modulation of the cell C at a desired value.

As discussed above, the optical modulation element 14B is constituted by the plurality of microcells C that carry out phase modulation by spin injection into the magnetization free layer C14. Therefore, the optical modulation element 14B can switch the optical path of the signal light Li from one to another more quickly, when compared to DMD or LCOS.

The description of the present configuration example has dealt with the microcell C having a similar configuration to that of a spin transfer torque (STT) magnetoresistive random access memory (MRAM). For example, a microcell C having a similar configuration to that of a spin orbit torque (SOT) MRAM may be used. Note that such a microcell C can be realized by removing, from the structure indicated in (b) of FIG. 4, the insulating layer C15, the magnetization fixed layer C16, and the second electrode C17, for example. In this case, for example, it is possible to efficiently inject a spin flow into the magnetization free layer C14 by incorporating heavy metal in the first electrode C13 and giving a pulse voltage or a pulse current to the first electrode C13.

(Variations of Optical Switch)

Figure 5:
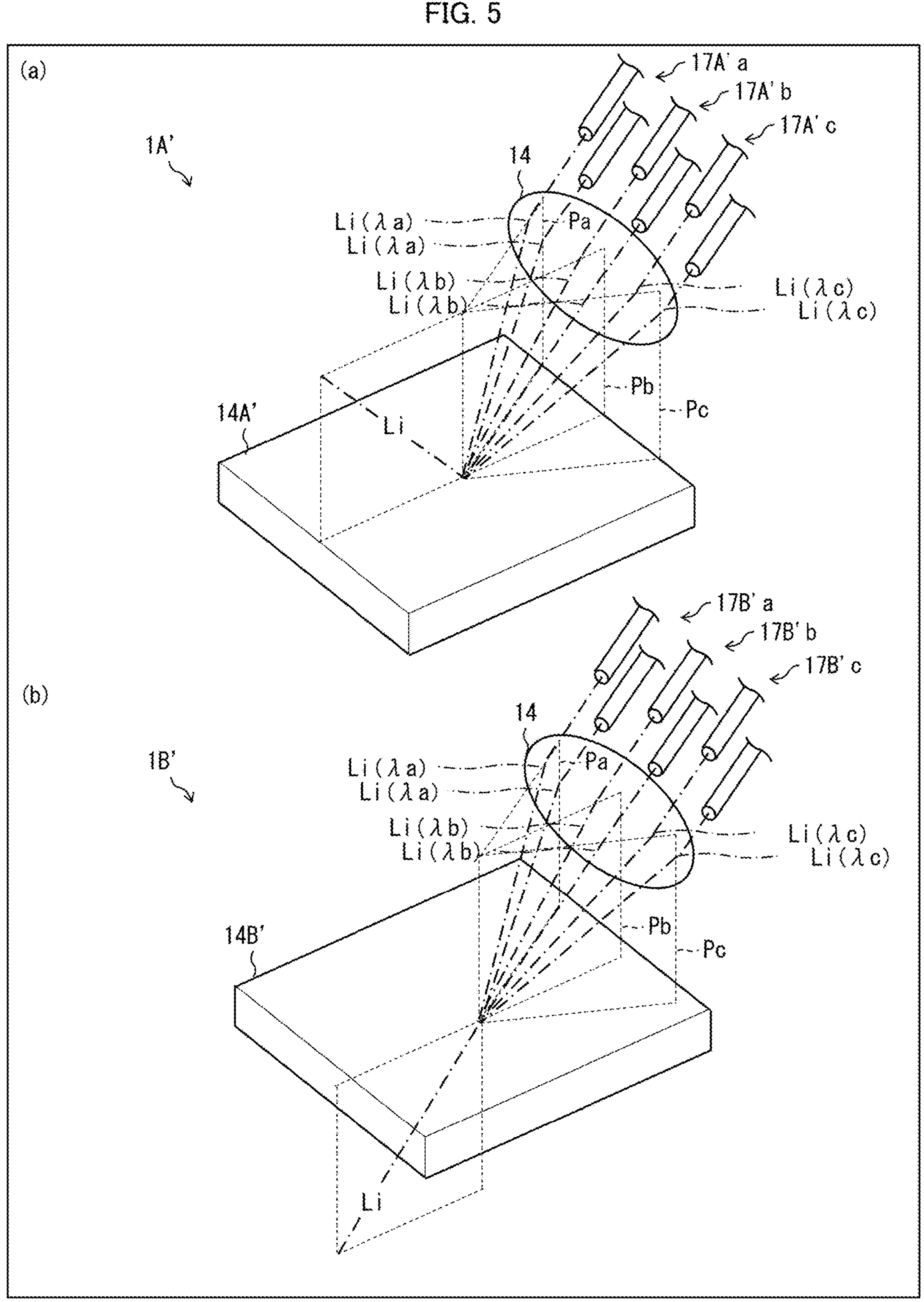
FIG. 5 shows a perspective view illustrating a configuration of a part of a variation of the optical switch shown in FIG. 2, more specifically, a configuration of a part of a variation of the reflective optical switch shown in (a) of FIG. 2 and a configuration of a part of a variation of the transmissive optical switch shown in (b) of FIG. 2.

The following description will discuss, with reference to (a) of FIG. 5, a variation of the optical switch 1A (hereinafter, referred to as an optical switch 1A'). (a) of FIG. 5 is a perspective view illustrating a portion of a configuration of the optical switch 1A'.

The optical switch 1A' has the same configuration as that of the optical switch 1A, except that the optical switch 1A' includes an optical modulation element 14A' in place of the optical modulation element 14A and output port groups 17A'a to 17A'c in place of the output port group 17A.

The optical modulation element 14A' is a means that modulates and reflects the signal light Li, and is constituted by a plurality of cells having phase modulation amounts settable independently of each other. The phase modulation amounts of the cells constituting the optical modulation element 14A' are set so that the signal light Li is reflected in a direction corresponding to a wavelength Δ of carrier light L0 and a control signal Ci. In the illustrated example, the following setting is made.

In a case where the wavelength Δ of the carrier light L0 is Δa, the optical modulation element 14A' reflects the signal light Li in an in-plane direction of a plane Pa. Particularly, in a case where the control signal Ci is 101, the optical modulation element 14A' reflects the signal light Li so that an emission angle thereof is θ1 in the plane Pa. Meanwhile, in a case where the control signal Ci is 010, the optical modulation element 14A' reflects the signal light Li so that an emission angle thereof is θ2 in the plane Pa.

In a case where the wavelength Δ of the carrier light L0 is Δb, the optical modulation element 14A' reflects the signal light Li in an in-plane direction of a plane Pb. Particularly, in a case where the control signal Ci is 101, the optical modulation element 14A' reflects the signal light Li so that an emission angle thereof is θ1 in the plane Pb. Meanwhile, in a case where the control signal Ci is 010, the optical modulation element 14A' reflects the signal light Li so that an emission angle thereof is θ2 in the plane Pb.

In a case where the wavelength Δ of the carrier light L0 is Δc, the optical modulation element 14A' reflects the signal light Li in an in-plane direction of a plane Pc. Particularly, in a case where the control signal Ci is 101, the optical modulation element 14A' reflects the signal light Li so that an emission angle thereof is θ1 in the plane Pc. Meanwhile, in a case where the control signal Ci is 010, the optical modulation element 14A' reflects the signal light Li so that an emission angle thereof is θ2 in the plane Pc.

The output port group 17A'a is disposed on an optical path of the signal light Li which has been reflected by the optical modulation element 14A' and whose wavelength Δ is Δa. The output port group 17A'a is constituted by an output port disposed on an optical path of the signal light Li reflected by the optical modulation element 14B so that an emission angle thereof is θ1 and an output port disposed on an optical path of the signal light Li reflected by the optical modulation element 14B so that an emission angle thereof is θ2.

The output port group 17A'b is disposed on an optical path of the signal light Li which has been reflected by the optical modulation element 14A' and whose wavelength Δ is Δb. The output port group 17A'b is constituted by an output port disposed on an optical path of the signal light Li reflected by the optical modulation element 14B so that an emission angle thereof is θ1 and an output port disposed on an optical path of the signal light Li reflected by the optical modulation element 14B so that an emission angle thereof is θ2.

The output port group 17A'c is disposed on an optical path of the signal light Li which has been reflected by the optical modulation element 14A' whose wavelength Δ is Δc. The output port group 17A'c is constituted by an output port disposed on an optical path of the signal light Li reflected by the optical modulation element 14B so that an emission angle thereof is θ1 and an output port disposed on an optical path of the signal light Li reflected by the optical modulation element 14B so that an emission angle thereof is θ2.

The optical switch 1A' can switch the optical path of the signal light Li from one to another not only according to the control signal Ci but also according to the wavelength Δ of the carrier light L0. Further, in a case where the signal light Li is a wavelength-division multiplexed one, the optical switch 1A' can separate wavelength components in the signal light Li from each other.

The following description will discuss, with reference to (b) of FIG. 5, a variation of the optical switch 1B (hereinafter, referred to as an optical switch 1B'). (b) of FIG. 5 is a perspective view illustrating a configuration of the optical switch 1B'.

The optical switch 1B' has the same configuration as that of the optical switch 1B, except that the optical switch 1B' includes an optical modulation element 14B' in place of the optical modulation element 14B and output port groups 17B'b to 17B'c in place of the output port group 17B.

The optical modulation element 14B' is a means that modulates and refracts signal light Li, and is constituted by a plurality of cells having phase modulation amounts settable independently of each other. The phase modulation amounts of the cells constituting the optical modulation element 14B' are set so that the signal light Li is refracted in a direction corresponding to a wavelength Δ of carrier light L0 and a control signal Ci. In the illustrated example, the following setting is made.

In a case where the wavelength Δ of the carrier light L0 is Δa, the optical modulation element 14B' refracts the signal light Li in an in-plane direction of a plane Pa. Particularly, in a case where the control signal Ci is 101, the optical modulation element 14B' refracts the signal light Li so that an emission angle thereof is θ1 in the plane Pa. Meanwhile, in a case where the control signal Ci is 010, the optical modulation element 14B' refracts the signal light Li so that an emission angle thereof is θ2 in the plane Pa.

In a case where the wavelength Δ of the carrier light L0 is Δb, the optical modulation element 14B' refracts the signal light Li in an in-plane direction of a plane Pb. Particularly, in a case where the control signal Ci is 101, the optical modulation element 14B' refracts the signal light Li so that an emission angle thereof is θ1 in the plane Pb. Meanwhile, in a case where the control signal Ci is 010, the optical modulation element 14B' refracts the signal light Li so that an emission angle thereof is θ2 in the plane Pb.

In a case where the wavelength Δ of the carrier light L0 is Δc, the optical modulation element 14B' refracts the signal light Li in an in-plane direction of a plane Pc. Particularly, in a case where the control signal Ci is 101, the optical modulation element 14B' refracts the signal light Li so that an emission angle thereof is θ1 in the plane Pc. Meanwhile, in a case where the control signal Ci is 010, the optical modulation element 14B' refracts the signal light Li so that an emission angle thereof is θ2 in the plane Pc.

The output port group 17B'a is disposed on an optical path of the signal light Li which has been refracted by the optical modulation element 14B' whose wavelength Δ is Δa. The output port group 17B'a is constituted by an output port disposed on an optical path of the signal light Li refracted by the optical modulation element 14B so that an emission angle thereof is θ1 and an output port disposed on an optical path of the signal light Li refracted by the optical modulation element 14B so that an emission angle thereof is θ2.

The output port group 17B'b is disposed on an optical path of the signal light Li which has been refracted by the optical modulation element 14B' whose wavelength Δ is Δb. The output port group 17B'b is constituted by an output port disposed on an optical path of the signal light Li refracted by the optical modulation element 14B so that an emission angle thereof is θ1 and an output port disposed on an optical path of the signal light Li refracted by the optical modulation element 14B so that an emission angle thereof is θ2.

The output port group 17B'c is disposed on an optical path of the signal light Li which has been refracted by the optical modulation element 14B' and whose wavelength Δ is Δc. The output port group 17B'b is constituted by an output port disposed on an optical path of the signal light Li refracted by the optical modulation element 14B so that an emission angle thereof is θ1 and an output port disposed on an optical path of the signal light Li refracted by the optical modulation element 14B so that an emission angle thereof is θ2.

The optical switch 1B' can switch the optical path of the signal light Li from one to another not only according to the control signal Ci but also according to the wavelength Δ of the carrier light L0. Further, in a case where the signal light Li is a wavelength-division multiplexed one, the optical switch 1B' can separate wavelength components in the signal light Li from each other.

SUMMARY

An optical switch in accordance with a first aspect of one or more embodiments is an optical switch that switches an optical path of signal light from one to another, the signal light being obtained by modulating carrier light by a control signal and a data signal, the optical switch including: a mirror and a half mirror; an optical modulation element configured to reflect or refract the signal light reflected by the mirror and the half mirror, the optical modulation element including a plurality of cells having phase modulation amounts settable independently of each other; a light detector configured to detect, at once, intensities of beams of the signal light having been reflected by the mirror and the half mirror different times and having passed through the half mirror; and a control section (a controller) configured (a) to decode the control signal from the intensities of the beams of the signal light detected at once by the light detector and (b) to set the phase modulation amounts of the plurality of cells included in the optical modulation element so that the signal light is emitted in a direction corresponding to the control signal.

In accordance with the above configuration, it is possible to switch the optical path of the signal light from one to another according to the control signal superimposed on the signal light.

An optical switch in accordance with a second aspect of one or more embodiments employs, in addition to the configuration of the first aspect, a configuration wherein: the signal light is modulated by one-bit control signal per Tc seconds; and a distance between the mirror and the half mirror is set so that a period of time from (i) reflection of the signal light by the half mirror to (ii) re-entry of the signal light into the half mirror is Tc.

In accordance with the above configuration, it is possible to decode, from the intensities of the beams of the signal light detected at once by the light detector, continuous bits of the control signal superimposed on the signal light.

An optical switch in accordance with a third aspect of one or more embodiments employs, in addition to the configuration of the first or second aspect, a configuration wherein: the control signal designates one optical path per n bit, where n is any integer of not less than 1; and the light detector detects, at once, a beam of the signal light reflected by the mirror m times, a beam of the signal light reflected by the mirror m+1 times, . . . , and a beam of the signal light reflected by the mirror m+n times, where m is any integer of not less than 0.

In accordance with the above configuration, it is possible to decode, from the intensities of the beams of the signal light detected at once by the light detector, continuous n bits of the control signal superimposed on the signal light.

An optical switch in accordance with a fourth aspect of one or more embodiments employs, in addition to the configuration of any one of the first to third aspects, a configuration wherein the optical switch further includes: an input port which guides the signal light entering the optical switch; and a plurality of output ports disposed in respective emission directions of the signal light, each of the plurality of output ports guiding the signal light to be emitted from the optical switch.

In accordance with the above configuration, it is possible to switch, from one to another among the plurality of output ports, an output port to output the signal light having been input via the input port, the switching being carried out according to the control signal superimposed on the signal light.

An optical switch in accordance with a fifth aspect of one or more embodiments employs, in addition to the configuration of any one of the first to fourth aspects, a configuration wherein: the optical modulation element is a reflective optical modulation element; and the control section sets the phase modulation amounts of the plurality of cells in the optical modulation element so that the signal light is reflected in the direction corresponding to the control signal.

In accordance with the above configuration, it is possible to realize a reflective optical switch that can switch the optical path of the signal light from one to another according to the control signal superimposed on the signal light.

An optical switch in accordance with a sixth aspect of one or more embodiments employs, in addition to the configuration of any one of the first to fourth aspects, a configuration wherein: the optical modulation element is a transmissive optical modulation element; and the control section sets the phase modulation amounts of the plurality of cells in the optical modulation element so that the signal light is refracted in the direction corresponding to the control signal.

In accordance with the above configuration, it is possible to realize a transmissive optical switch that can switch the optical path of the signal light from one to another according to the control signal superimposed on the signal light.

An optical switch in accordance with a seventh aspect of one or more embodiments employs, in addition to the configuration of any one of the first to sixth aspects, a configuration wherein: the optical modulation element is constituted by the plurality of cells that carry out phase modulation by spin injection into a magnetization free layer.

In accordance with the above configuration, it is possible to quickly switch the optical path of the signal light from one to another according to the control signal superimposed on the signal light.

A switching method in accordance with an eighth aspect of one or more embodiments is a switching method that switches an optical path of signal light from one to another, the signal light being obtained by modulating carrier light by a control signal and a data signal, the switching method including the steps of: reflecting or refracting, with use of an optical modulation element, the signal light reflected by a mirror and a half mirror, the optical modulation element including a plurality of cells having phase modulation amounts settable independently of each other; detecting, at once, intensities beams of the signal light having been reflected by the mirror and the half mirror different times and having passed through the half mirror; and decoding the control signal from the intensities of the beams of the signal light detected at once and setting the phase modulation amounts of the plurality of cells in the optical modulation element so that the signal light is emitted in a direction corresponding to the control signal.

In accordance with the above method, it is possible to switch the optical path of the signal light from one to another according to the control signal superimposed on the signal light.

SUPPLEMENTARY NOTES

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST

1A, 1B, 1A', 1B': optical switch
11: input port
12: mirror
13: half mirror
14A, 14A', 14B, 14B': optical modulation element
15: light detector
16A, 16B: control section (controller)
17A, 17B: output port group
18A, 18B: lens

The invention claimed is:

1. An optical switch that switches an optical path of signal light obtained by modulating carrier light by a control signal and a data signal, comprising:
a mirror and a half mirror;
an optical modulation element that:
reflects or refracts the signal light reflected by the mirror and the half mirror, and
includes cells each having an independently set phase modulation amount;
a light detector that detects, at once, intensities of beams of the signal light passing through the half mirror and reflected by the mirror and the half mirror different times; and
a controller that:
decodes the control signal from the detected intensities, and
sets the independently set phase modulation amount of each of the cells such that the signal light is emitted in a direction corresponding to the control signal.

2. The optical switch according to claim 1, wherein
the signal light is modulated by one-bit control signal per Tc seconds, and
the optical switch sets a distance between the mirror and the half mirror such that a period of time from reflection of the signal light by the half mirror to re-entry of the signal light into the half mirror is Tc.

3. The optical switch according to claim 1, wherein
the control signal designates one optical path per n bit where n is any integer equal to or greater than 1, and
the detected beams include from a beam of the signal light reflected by the mirror m times to a beam of the signal light reflected by the mirror m+n times where m is any integer equal to or greater than 0.

4. The optical switch according to claim 1, further comprising:
an input port that guides the signal light entering the optical switch; and
output ports, disposed in each of emission directions of the signal light, each of which guides the signal light emitted from the optical switch.

5. The optical switch according to claim 1, wherein
the optical modulation element is a reflective optical modulation element, and
the controller sets the independently set phase modulation amount of each of the cells such that the signal light is reflected in the direction corresponding to the control signal.

6. The optical switch according to claim 1, wherein
the optical modulation element is a transmissive optical modulation element, and
the controller sets the independently set phase modulation amount of each of the cells such that the signal light is refracted in the direction corresponding to the control signal.

7. The optical switch according to claim 1, wherein the cells carry out phase modulation by spin injection into a magnetization free layer.

8. A switching method comprising:
switching an optical path of signal light obtained by modulating carrier light by a control signal and a data signal;
reflecting or refracting, with an optical modulation element, the signal light reflected by a mirror and a half mirror, wherein the optical modulation element includes cells each having an independently set phase modulation amount;

detecting, at once, intensities of beams of the signal light passing through the half mirror and reflected by the mirror and the half mirror different times; and decoding the control signal from the detected intensities and setting the independently set phase modulation amount of each of the cells such that the signal light is emitted in a direction corresponding to the control signal.

* * * * *